(12) United States Patent
Ohte et al.

(10) Patent No.: US 11,780,271 B2
(45) Date of Patent: Oct. 10, 2023

(54) TIRE

(71) Applicant: Sumitomo Rubber Industries, Ltd., Kobe (JP)

(72) Inventors: Yuto Ohte, Kobe (JP); Ryota Ikeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/839,483

(22) Filed: Jun. 14, 2022

(65) Prior Publication Data

US 2022/0396100 A1    Dec. 15, 2022

(30) Foreign Application Priority Data

Jun. 15, 2021    (JP) .................................. 2021-099590

(51) Int. Cl.
*B60C 11/12* (2006.01)
*B60C 11/03* (2006.01)
*B60C 11/04* (2006.01)

(52) U.S. Cl.
CPC ...... *B60C 11/1281* (2013.01); *B60C 11/0302* (2013.01); *B60C 11/0304* (2013.01); *B60C 11/04* (2013.01); *B60C 11/1236* (2013.01)

(58) Field of Classification Search
CPC .. B60C 11/12; B60C 11/1236; B60C 11/1263
See application file for complete search history.

(56) References Cited

U.S. PATENT DOCUMENTS

| 2013/0112325 A1* | 5/2013 | Mukai .................. B60C 11/125 |
| | | 152/209.8 |
| 2018/0009269 A1* | 1/2018 | Kawagoe ............ B60C 11/1236 |
| 2020/0238766 A1* | 7/2020 | Hamaoka ............ B60C 11/1218 |
| 2021/0107318 A1* | 4/2021 | Speziari ................ B60C 11/033 |

FOREIGN PATENT DOCUMENTS

| EP | 0114594 B1 | * 12/1989 | |
| EP | 3750723 A1 | * 12/2020 | ............. B60C 11/13 |
| JP | 2001-206020 A | 7/2001 | |

* cited by examiner

*Primary Examiner* — Cedrick S Williams
(74) *Attorney, Agent, or Firm* — XSENSUS LLP

(57) ABSTRACT

A tread portion 2 can include an inner tread end, an outer tread end, circumferential grooves, and land portions. The circumferential grooves can include an inner shoulder circumferential groove and an outer shoulder circumferential groove. The land portions can include an inner shoulder land portion and an outer shoulder land portion. The inner shoulder land portion can include inner shoulder lateral grooves and inner shoulder sipes. The outer shoulder land portion can include outer shoulder lateral grooves and outer shoulder sipes. Each outer shoulder sipe can have a chamfered portion at each of sipe edges on both sides. The chamfered portion can have a chamfered width that increases from a terminating end side toward the outer shoulder circumferential groove.

16 Claims, 10 Drawing Sheets

TIRE

CROSS-REFERENCE TO RELATED APPLICATION

The present application claims priority to Japanese patent application JP 2021-099590, filed on Jun. 15, 2021, the entire contents of which are incorporated herein by reference in its entirety.

BACKGROUND

Technical Field

The present disclosure relates to a tire.

Background Art

Japanese Laid-Open Patent Publication No. 2001-206020 suggests a pneumatic tire in which a plurality of inclined grooves and almost parallelogrammic blocks formed by the inclined grooves are formed in a tread surface. According to the publication, the pneumatic tire is expected to improve uneven wear resistance, ride comfort, and the like without degrading wet performance and the like by demarcating the block by siping to form a group of three or more block pieces.

In recent years, tires may have been required to achieve both reduction of exterior noise and enhancement of braking performance, and this tendency is prominent particularly in Europe.

For reducing exterior noise, reduction of a volume of grooves in the tread portion may be effective, and this may be considered to be effective also for enhancing braking performance. However, reduction of a volume of grooves in the tread portion may cause degradation of wet performance.

The present disclosure has been made in view of the aforementioned circumstances.

SUMMARY

The present disclosure is directed to a tire that can include a tread portion having a designated mounting direction to a vehicle. The tread portion can include an inner tread end located on an inner side of the vehicle when the tire is mounted to the vehicle, an outer tread end located on an outer side of the vehicle when the tire is mounted to the vehicle, a plurality of circumferential grooves extending continuously in a tire circumferential direction between the inner tread end and the outer tread end, and a plurality of land portions demarcated by the circumferential grooves. The plurality of circumferential grooves can include an inner shoulder circumferential groove closest to the inner tread end, and an outer shoulder circumferential groove closest to the outer tread end. The plurality of land portions can include an inner shoulder land portion outward of the inner shoulder circumferential groove in a tire axial direction, and an outer shoulder land portion outward of the outer shoulder circumferential groove in the tire axial direction. The inner shoulder land portion can include a plurality of inner shoulder lateral grooves and a plurality of inner shoulder sipes. Each inner shoulder lateral groove can extend from an inner end located between the inner tread end and the inner shoulder circumferential groove beyond the inner tread end. Each inner shoulder sipe can extend from the inner shoulder circumferential groove beyond the inner tread end. The outer shoulder land portion can include a plurality of outer shoulder lateral grooves and a plurality of outer shoulder sipes. Each outer shoulder lateral groove can extend from the outer shoulder circumferential groove beyond the outer tread end. Each outer shoulder sipe can extend from the outer shoulder circumferential groove and can have a terminating end between the outer shoulder circumferential groove and the outer tread end. Each outer shoulder sipe can have a chamfered portion at each of sipe edges on both sides. The chamfered portion can have a chamfered width that increases from the terminating end side toward the outer shoulder circumferential groove.

DETAILED DESCRIPTION

Figure 1:
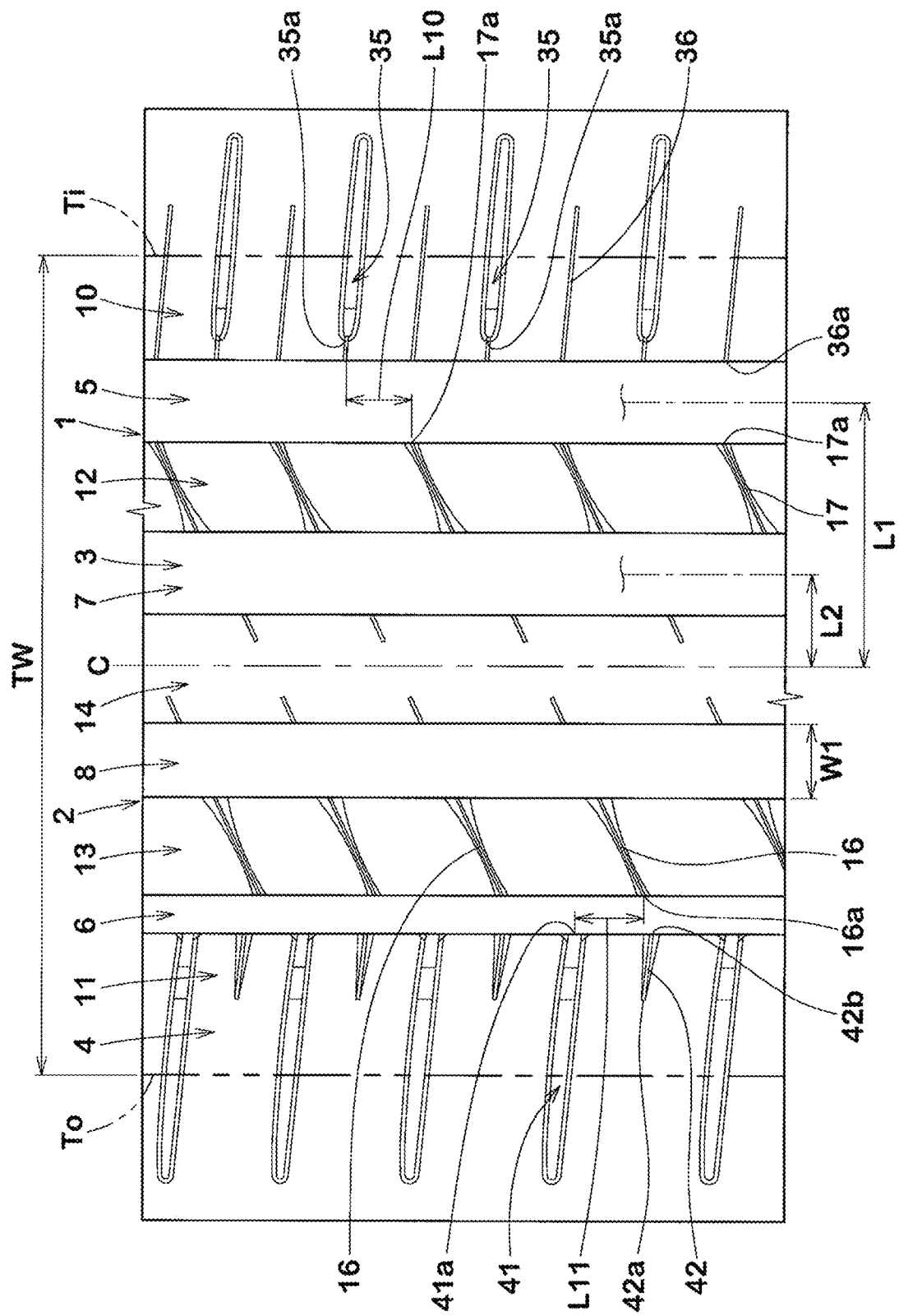
FIG. 1 is a development of a tread portion according to one embodiment of the present disclosure.

One embodiment of the present disclosure will be described below with reference to the drawings. FIG. 1 is a development of a tread portion 2 of a tire 1 according to one embodiment of the present disclosure. The tire 1 of the present embodiment may be used as, for example, a pneumatic tire for a passenger car. However, the present disclosure is not limited thereto, and may be applied to a heavy-duty pneumatic tire or a non-pneumatic tire the inside of which is not filled with pressurized air.

As shown in FIG. 1, the tire 1 of the present disclosure can include the tread portion 2 having a designated mounting direction to a vehicle. The tread portion 2 can include an inner tread end Ti located on the inner side of a vehicle when the tire 1 is mounted to the vehicle, and an outer tread end To located on the outer side of the vehicle when the tire 1 is mounted to the vehicle. The mounting direction to a vehicle may be indicated, for example, on a sidewall portion by characters or a symbol.

The inner tread end Ti and the outer tread end To may each correspond to the outermost ground contact position in the tire axial direction in a state where a normal load is applied to the tire 1 in a normal state and the tire 1 is in contact with a plane at a camber angle of 0°, for instance.

The "normal state" can represent or be characterized as a state in which a tire is mounted on a normal rim and is inflated to a normal internal pressure and no load is applied to the tire, in a case where the tire is a pneumatic tire for which various standards are defined. For non-pneumatic tires and tires for which various standards are not defined, the normal state can represent or be characterized as a standard use state, corresponding to a purpose of use of the tire, in which the tire is not mounted to a vehicle and no load is applied to the tire. In the description herein, unless otherwise specified, dimensions and the like of components of the tire are represented as values measured in the normal state.

The "normal rim" can represent or be characterized as a rim that is defined by a standard, in a standard system including the standard on which the tire is based, for each tire, and may be, for example, "standard rim" in the JATMA standard, "Design Rim" in the TRA standard, or "Measuring Rim" in the ETRTO standard.

The "normal internal pressure" can represent or be characterized as an air pressure that is defined by a standard, in a standard system including the standard on which the tire is based, for each tire, and may be "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard.

The "normal load" can represent or be characterized as a load that is defined by a standard, in a standard system including the standard on which the tire is based, for each tire, and may be "maximum load capacity" in the JATMA standard, the maximum value recited in the table "TIRE LOAD LIMITS AT VARIOUS COLD INFLATION PRESSURES" in the TRA standard, or "LOAD CAPACITY" in the ETRTO standard, for the pneumatic tires for which various standards are defined. For non-pneumatic tires and tires for which various standards are not defined, the "normal load" can represent or be characterized as a load that acts on one tire in a standard mounting state of the tire. The "standard mounting state" can represent or be characterized as a state in which a tire is mounted to a standard vehicle corresponding to the purpose of use of the tire and the vehicle is stationary on a flat road surface in a state where the vehicle can run.

The tread portion 2 can include a plurality of circumferential grooves 3 that can extend continuously in the tire circumferential direction between the inner tread end Ti and the outer tread end To, and a plurality of land portions 4 demarcated by the circumferential grooves 3. In the present embodiment, the tire 1 be a so-called 5-rib tire in which the tread portion 2 includes five land portions 4 demarcated by four circumferential grooves 3. However, the tire 1 of the present disclosure is not limited thereto. For example, the tire 1 may be a so-called 4-rib tire in which the tread portion 2 includes four land portions 4 demarcated by three circumferential grooves 3.

The circumferential grooves 3 can include an inner shoulder circumferential groove 5 located closest to the inner tread end Ti, and an outer shoulder circumferential groove 6 located closest to the outer tread end To. In the present embodiment, the circumferential grooves 3 can also include an inner crown circumferential groove 7 and an outer crown circumferential groove 8. The inner crown circumferential groove 7 can be between the inner shoulder circumferential groove 5 and the tire equator C. The outer crown circumferential groove 8 can be between the outer shoulder circumferential groove 6 and the tire equator C.

A distance L1 in the tire axial direction from the tire equator C to a groove center line of the inner shoulder circumferential groove 5 or the outer shoulder circumferential groove 6 can be, for example, 25% to 35% of a tread width TW. A distance L2 in the tire axial direction from the tire equator C to a groove center line of the inner crown circumferential groove 7 or the outer crown circumferential groove 8 can be, for example, 5% to 15% of the tread width TW. The tread width TW can represent a distance in the tire axial direction from the inner tread end Ti to the outer tread end To in the normal state.

In the present embodiment, for example, each circumferential groove 3 can linearly extend so as to be parallel to the tire circumferential direction. Each circumferential groove 3 may extend, for example, in a wavy manner.

A groove width W1 of each circumferential groove 3 can be, for example, at least 3 mm. The groove width W1 of each circumferential groove 3 can be, for example, 2.0% to 8.0% of the tread width TW. In the present embodiment, the outer shoulder circumferential groove 6 can have the smallest groove width among the four circumferential grooves 3. However, the present disclosure is not limited thereto. A depth of each circumferential groove 3 can be, for example, 5 to 10 mm in a case where the tire 1 is a pneumatic tire for a passenger car.

In the present disclosure, the land portions 4 can include an inner shoulder land portion 10 and an outer shoulder land portion 11. The inner shoulder land portion 10 can be outward of the inner shoulder circumferential groove 5 in the tire axial direction and can include the inner tread end Ti. The outer shoulder land portion 11 can be outward of the outer shoulder circumferential groove 6 in the tire axial direction, and can include the outer tread end To.

In the present embodiment, the land portions 4 can also include an inner middle land portion 12, an outer middle land portion 13, and a crown land portion 14. The inner middle land portion 12 can be demarcated between the inner shoulder circumferential groove 5 and the inner crown circumferential groove 7. That is, the inner middle land portion 12 can be adjacent to the inner shoulder land portion 10 via the inner shoulder circumferential groove 5. The outer middle land portion 13 can be between the outer shoulder circumferential groove 6 and the outer crown circumferential groove 8. That is, the outer middle land portion 13 can be adjacent to the outer shoulder land portion 11 via the outer shoulder circumferential groove 6. The crown land portion 14 can be demarcated between the inner crown circumferential groove 7 and the outer crown circumferential groove 8.

Figure 2:
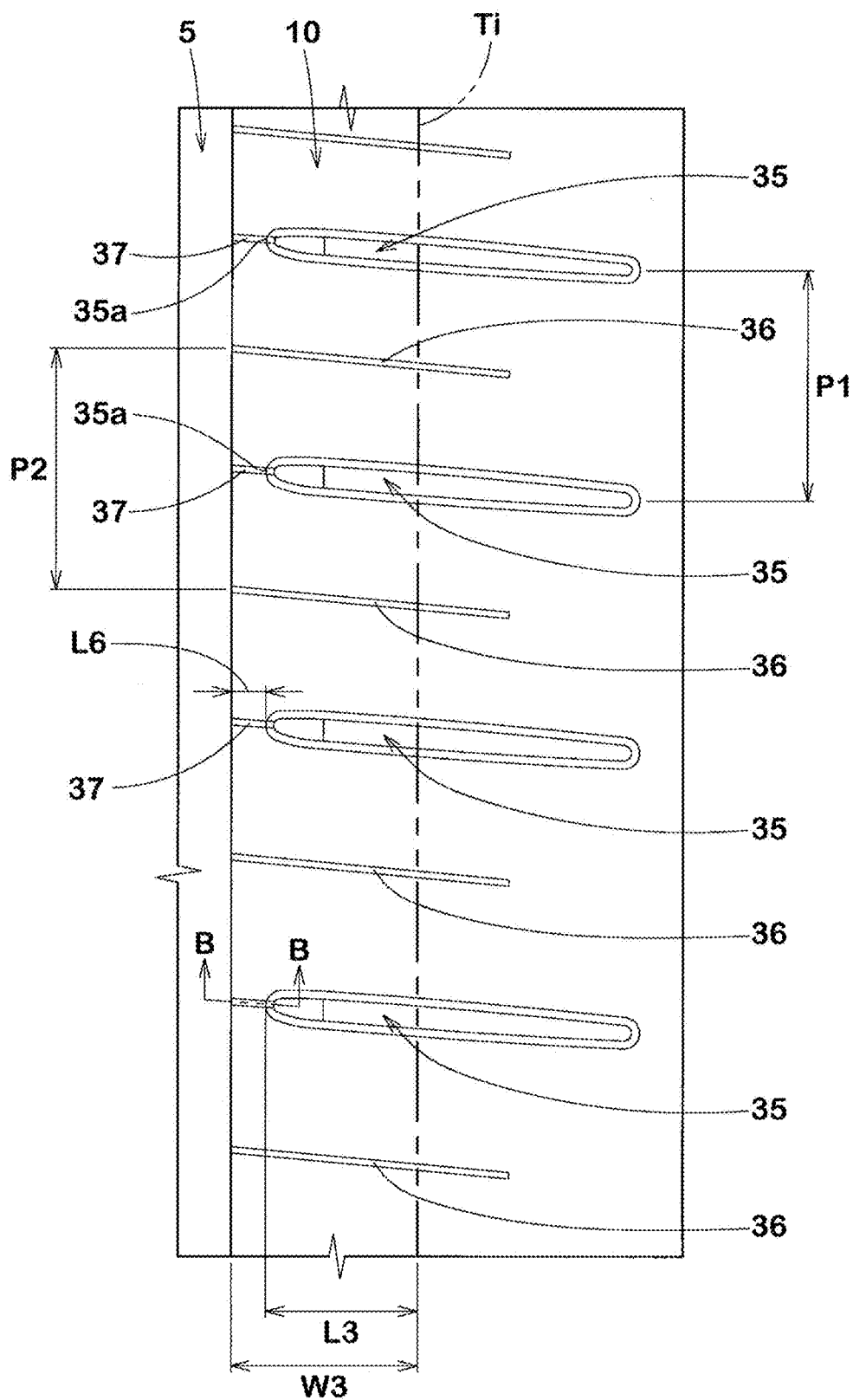
FIG. 2 is an enlarged view of an inner shoulder land portion of the tread portion in FIG. 1.

FIG. 2 is an enlarged view of the inner shoulder land portion 10. As shown in FIG. 2, the inner shoulder land portion 10 can include a plurality of inner shoulder lateral grooves 35 and a plurality of inner shoulder sipes 36. In the present embodiment, the inner shoulder lateral grooves 35 and the inner shoulder sipes 36 can alternate in the tire circumferential direction.

The inner shoulder lateral groove 35 can extend from an inner end 35a located between the inner tread end Ti and the inner shoulder circumferential groove 5 beyond the inner tread end Ti. The inner shoulder sipe 36 can extend from the inner shoulder circumferential groove 5 beyond the inner tread end Ti.

In the description herein, the "sipe" can represent or be characterized as a cut element having a small width such that, in a sipe body portion in which a pair of sipe walls are disposed substantially parallel to each other, a width between the two sipe walls is not greater than 1.5 mm, for instance. According to one or more embodiments, the width can be 0.5 to 1.5 mm. A chamfered portion having a width of greater than 1.5 mm, for instance, may be connected to the opening of the sipe. A flask bottom having a width of greater than 1.5 mm, for instance, may be connected to the bottom of the sipe.

Figure 3:
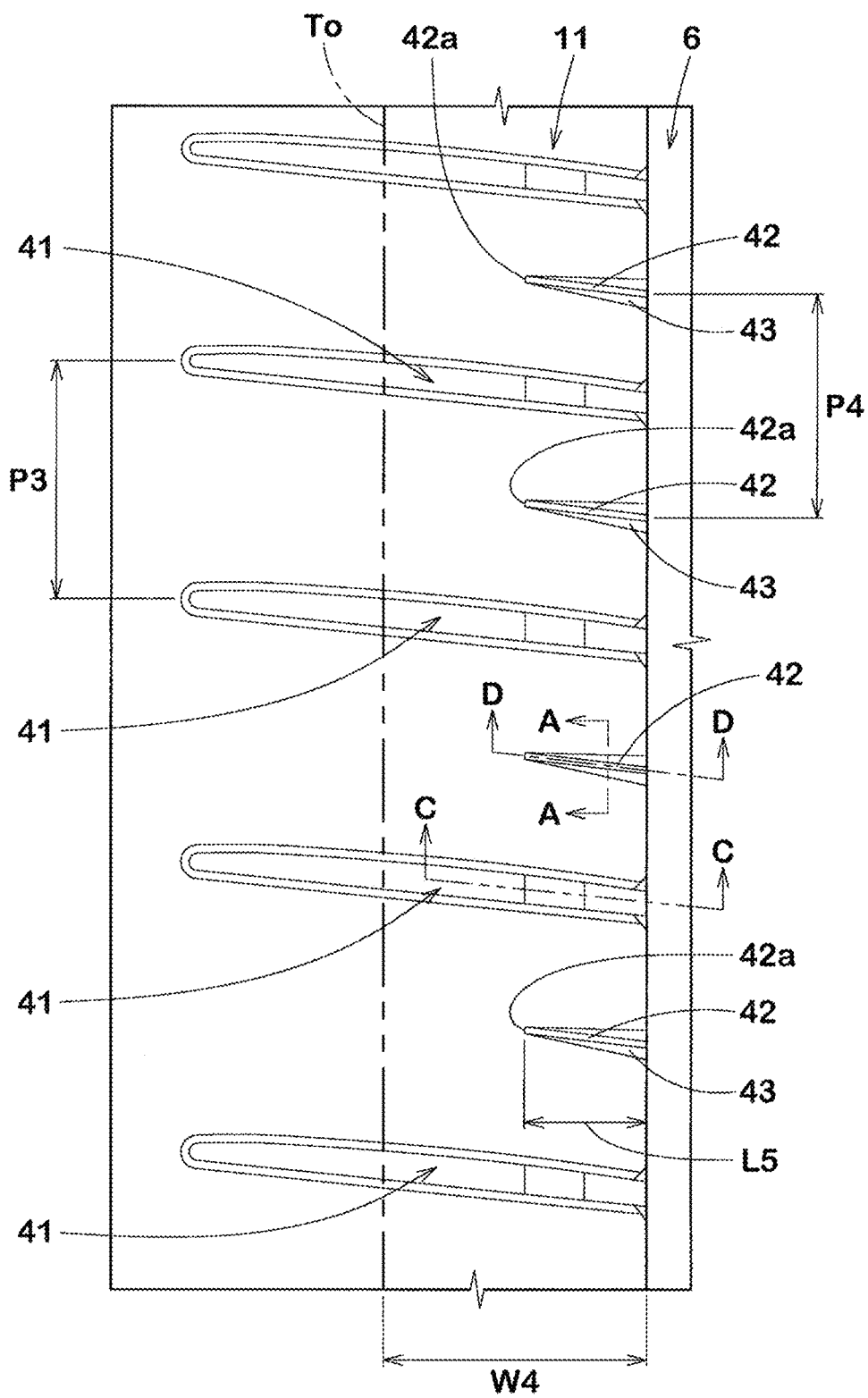
FIG. 3 is an enlarged view of an outer shoulder land portion of the tread portion in FIG. 1.

FIG. 3 is an enlarged view of the outer shoulder land portion 11. As shown in FIG. 3, the outer shoulder land portion 11 can include a plurality of outer shoulder lateral grooves 41 and a plurality of outer shoulder sipes 42. In the present embodiment, the outer shoulder lateral grooves 41 and the outer shoulder sipes 42 can alternate in the tire circumferential direction.

The outer shoulder lateral groove 41 can extend from the outer shoulder circumferential groove 6 beyond the outer tread end To. The outer shoulder sipe 42 can extend from the outer shoulder circumferential groove 6 and can have a terminating end 42a between the outer shoulder circumferential groove 6 and the outer tread end To.

Figure 4:
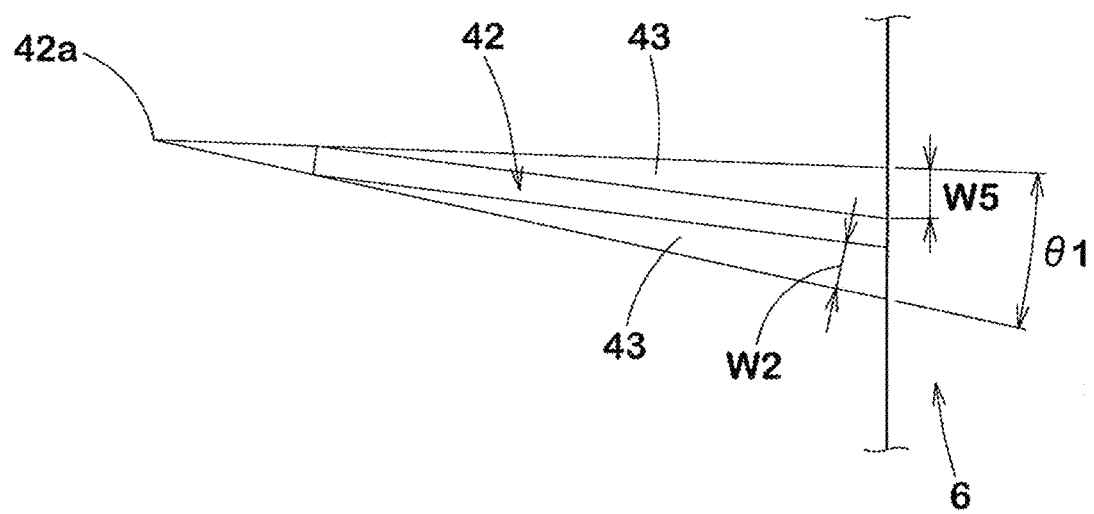
FIG. 4 is an enlarged view of an outer shoulder sipe of the outer shoulder land portion in FIG. 3.
Figure 5:
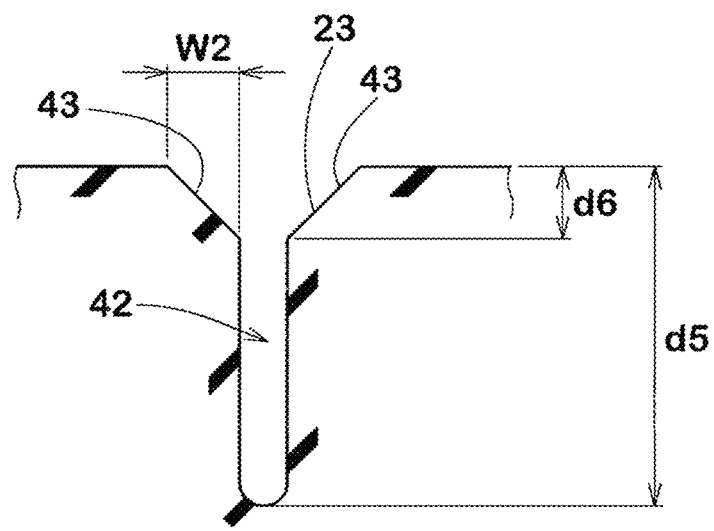
FIG. 5 is a cross-sectional view taken along a line A-A in FIG. 3.

FIG. 4 is an enlarged view of the outer shoulder sipe 42. FIG. 5 is a cross-sectional view taken along a line A-A in FIG. 3. As shown in FIG. 4 and FIG. 5, the outer shoulder sipe 42 can have a chamfered portion 43 at each of sipe edges on both sides. In the present embodiment, for example, the chamfered portion 43 can be formed by an inclined surface 23 extending between a ground contact surface of the land portion and the sipe inner wall. The inclined surface 23 can be, for example, disposed at an angle of 30 to 60° relative to the line, normal to the tire, passing through the ground contact surface of the land portion.

The chamfered portion 43 can have a chamfered width W2 increased from the terminating end 42a side toward the outer shoulder circumferential groove 6. In the present disclosure, by adopting the above-describe structure, noise performance and braking performance can be enhanced while wet performance is maintained.

As shown in FIG. 2, the inner shoulder lateral groove 35 can have the inner end 35a between the inner shoulder circumferential groove 5 and the inner tread end Ti, so that pumping sound is small to contribute to reduction of exterior noise. The inner shoulder lateral groove 35 may also be expected to exhibit drainage performance to a certain degree, and may also contribute to maintaining wet performance.

The inner shoulder sipe 36 can allow wet performance to be maintained by its edge effect. The inner shoulder sipe 36 can reduce strain in a ground contact surface of the inner shoulder land portion 10 and can make a ground contact pressure uniform, to consequently contribute to exhibiting a high frictional force over the entirety of the ground contact surface of the inner shoulder land portion 10. Such an action can enable braking performance to be enhanced.

As shown in FIG. 3, the outer shoulder lateral groove 41 can extend from the outer shoulder circumferential groove 6 beyond the outer tread end To, and thus can exhibit excellent drainage performance to contribute to enhancement of wet performance. The outer shoulder sipe 42 having the chamfered portion 43 formed therein can uniformize a ground contact pressure acting on the outer shoulder land portion 11. Thus, a frictional force can be exerted at the outer shoulder land portion 11 in the tire axial direction in a well-balanced manner, which can result in enhancement of braking performance.

Furthermore, as shown in FIG. 4 and FIG. 5, the chamfered portion 43 of the outer shoulder sipe 42 can have chamfered width increased from the terminating end 42a side toward the outer shoulder circumferential groove 6. Therefore, a striking sound can be reduced when the groove edge of the outer shoulder circumferential groove 6 comes into contact with the ground, and water pushed away by the outer shoulder sipe 42 can be positively guided toward the outer shoulder circumferential groove 6 during running on a wet surface. Through the above-described mechanism, the tire 1 of the present disclosure may enhance noise performance and braking performance while maintaining wet performance.

The configurations of the present embodiment will be described below in more detail. The configurations described below can represent a specific mode of the present embodiment. Therefore, it is needless to say that the present disclosure can provide the above-described effect even when the configurations described below are not provided. In addition, even when any one of the configurations described below is independently applied to the tire according to the present disclosure having the above-described characteristics, performance improvement corresponding to each configuration can be expected. Furthermore, when some of the configurations described below are applied in combination, complex performance improvement corresponding to the configurations can be expected.

As shown in FIG. 2, for example, one pitch length P1 in the tire circumferential direction for the plurality of inner shoulder lateral grooves 35, and one pitch length P2 in the tire circumferential direction for the plurality of inner shoulder sipes 36 can each be 110% to 150% of a width W3, in the tire axial direction, of the ground contact surface of the inner shoulder land portion 10. Thus, wet performance and noise performance can be enhanced in a well-balanced manner. The one pitch length, in the tire circumferential direction, for lateral grooves aligned in the tire circumferential direction can correspond to a distance, in the tire circumferential direction, between groove center lines of two adjacent lateral grooves. The same can apply to the one pitch length for the sipes.

For example, the inner shoulder lateral groove 35 can extend across the center position, in the tire axial direction, of the ground contact surface of the inner shoulder land portion 10. A length L3, in the tire axial direction, of the inner shoulder lateral groove 35 at the ground contact surface of the inner shoulder land portion 10 can be, for example, 70% to 90% of the width W3, in the tire axial direction, of the ground contact surface of the inner shoulder land portion 10. The inner shoulder lateral groove 35 having such a structure can contribute to enhancement of braking performance while maintaining wet performance.

The inner shoulder lateral groove 35 can be, for example, inclined in the right-downward direction relative to the tire axial direction. Hereinafter, in the description herein, this inclination direction may be expressed by "inclined in a first direction relative to the tire axial direction." An angle of the inner shoulder lateral groove 35 relative to the tire axial direction can be, for example, 5 to 15°. The inner shoulder lateral groove 35 having such a structure can guide water thereinside toward the inner tread end Ti during running on a wet surface and can exhibit excellent drainage performance.

For example, the inner shoulder sipe 36 can linearly extend so as to be inclined in the first direction relative to the tire axial direction. An angle of the inner shoulder sipe 36 relative to the tire axial direction can be, for example, 5 to 15°. An angular difference between the inner shoulder sipe 36 and the inner shoulder lateral groove 35 can be not greater than 10°, and, in the present embodiment, the inner shoulder sipe 36 and the inner shoulder lateral groove 35 can extend in parallel to each other. The inner shoulder sipe 36 having such a structure can enhance noise performance and ride comfort while reducing uneven wear of the inner shoulder land portion 10.

The inner shoulder sipe 36 may not have any chamfered portions. That is, the inner shoulder sipe 36 can have a sipe wall that can be connected directly to the ground contact surface of the inner shoulder land portion 10, and that can extend along the tire radial direction. The inner shoulder sipe 36 having such a structure can exert, with its edges, a high frictional force during running on a wet surface.

In the present embodiment, the inner shoulder land portion 10 can have an auxiliary sipe 37 that can extend from the inner shoulder circumferential groove 5 to the inner end 35a of the inner shoulder lateral groove 35. The auxiliary sipe 37 having such a structure can contribute to maintaining wet performance.

Figure 6:
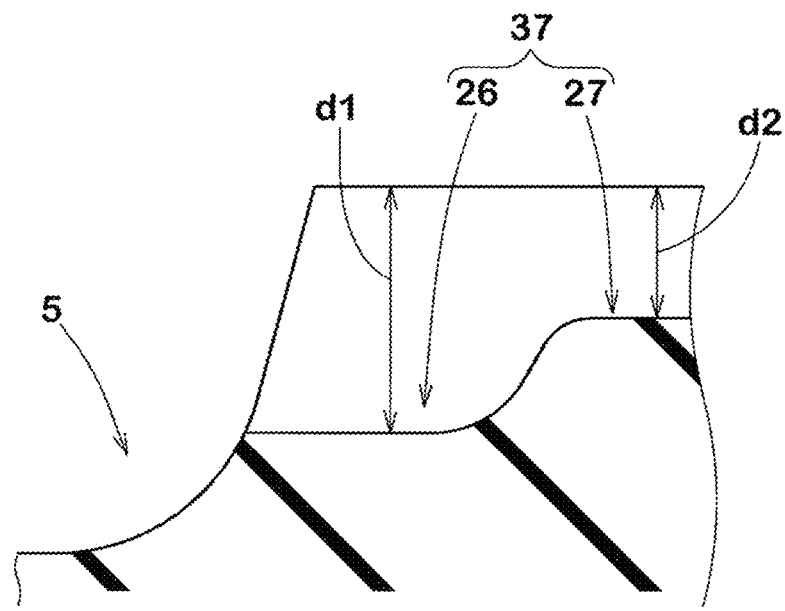
FIG. 6 is a cross-sectional view taken along a line B-B in FIG. 2.

FIG. 6 is a cross-sectional view taken along a line B-B in FIG. 2. As shown in FIG. 6, in the present embodiment, the auxiliary sipe 37 can include, for example, a deep bottom portion 26 disposed on the inner shoulder circumferential groove 5 side and a shallow bottom portion 27 disposed on the inner shoulder lateral groove 35 (shown in FIG. 2) side. A depth d2 of the shallow bottom portion 27 can be 40% to 60% of a depth d1 of the deep bottom portion 26. The auxiliary sipe 37 having such a structure can enhance wet performance while maintaining stiffness of the inner shoulder land portion 10.

As shown in FIG. 3, for example, one pitch length P3 in the tire circumferential direction for the plurality of outer shoulder lateral grooves 41 and one pitch length P4 in the tire circumferential direction for the plurality of outer shoulder sipes 42 can each be, for instance, 80% to 120% of a width W4, in the tire axial direction, of a ground contact surface of the outer shoulder land portion 11.

The outer shoulder lateral groove 41 can be, for example, inclined in the first direction relative to the tire axial direction. An angle of the outer shoulder lateral groove 41 relative to the tire axial direction can be, for example, 5 to 15°. According to one or more embodiments, an angular difference between the outer shoulder lateral groove 41 and the inner shoulder lateral groove 35 (shown in FIG. 2) may not be greater than 10°, for instance, not greater than 5°.

Figure 7:
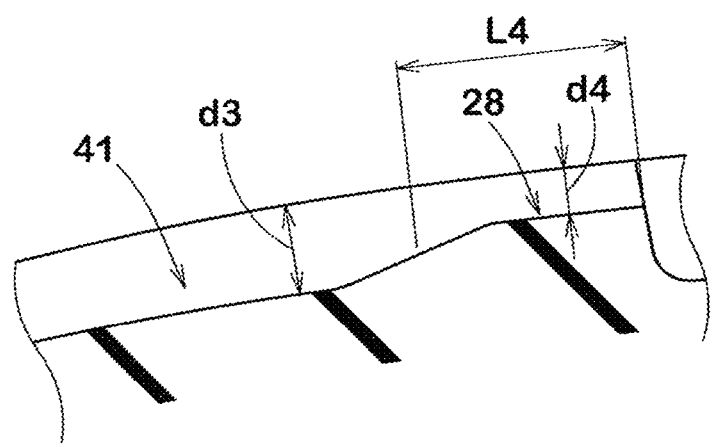
FIG. 7 is a cross-sectional view taken along a line C-C in FIG. 3.

FIG. 7 is a cross-sectional view taken along a line C-C in FIG. 3. As shown in FIG. 7, the outer shoulder lateral groove 41 can include a tie bar 28 having a locally raised groove bottom. The minimum depth d4 from the ground contact surface of the outer shoulder land portion 11 to the outer surface of the tie bar 28 can be, for instance, 40% to 60% of the maximum depth d3 of the outer shoulder lateral groove 41. The tie bar 28 having such a structure can enhance noise performance and braking performance while maintaining wet performance.

A length L4, in the tire axial direction, of the tie bar 28 can be, for example, 30% to 40% of the width W4 (shown in FIG. 3), in the tire axial direction, of the ground contact surface of the outer shoulder land portion 11. According to one or more embodiments, the length L4 of the tie bar 28 can be less than a length L5 (shown in FIG. 3), in the tire axial direction, of the outer shoulder sipe 42. Thus, wet performance, and noise performance and braking performance can be enhanced in a well-balanced manner. In a case where the length, in the tire axial direction, of the tie bar 28 can vary in the tire radial direction, the length of the tie bar 28 can be measured at the center position in the tire radial direction.

As shown in FIG. 3, the outer shoulder sipe 42 can be, for example, inclined in the first direction relative to the tire axial direction. An angle of the outer shoulder sipe 42 relative to the tire axial direction can be, for example, 5 to 15°. An angular difference between the outer shoulder sipe 42 and the outer shoulder lateral groove 41 may be not greater than 10°, and, in the present embodiment, the outer shoulder sipe 42 and the outer shoulder lateral groove 41 can extend in parallel to each other, for instance. The outer shoulder sipe 42 having such a structure can allow wet performance to be maintained while reducing uneven wear of the outer shoulder land portion 11.

The length L5, in the tire axial direction, of the outer shoulder sipe 42 can be, for instance, 40% to 60% of the width W4, in the tire axial direction, of the ground contact surface of the outer shoulder land portion 11. According to one or more embodiments, the length L5 of the outer shoulder sipe 42 may be less than the length L3 (shown in FIG. 2), in the tire axial direction, of the inner shoulder lateral groove 35, and greater than a length L6 (shown in FIG. 2), in the tire axial direction, of the auxiliary sipe 37. Thus, ground contact sounds of the inner shoulder land portion 10 and the outer shoulder land portion 11 may become white noise and noise performance can be enhanced.

As shown in FIG. 4, the chamfered width W2 of the chamfered portion 43 of the outer shoulder sipe 42 can be, for example, continuously increased from the terminating end 42a side toward the outer shoulder circumferential groove 6. An angle θ1 between one of edges and the other of the edges of the outer shoulder sipe 42 on the ground contact surface of the outer shoulder land portion 11 can be, for example, 5 to 15°. Thus, braking performance can be further enhanced.

The maximum chamfered width W5 of the chamfered portion 43 can be, for example, 2.0 to 4.0 mm. In the present embodiment, the maximum chamfered width W5 can be formed at the end of the outer shoulder sipe 42 on the outer shoulder circumferential groove 6 side. As shown in FIG. 5, the maximum depth d5 of the outer shoulder sipe 42 can be, for example, 4.0 to 6.0 mm. The maximum depth d6 of the chamfered portion 43 can be, for example, 0.5 to 2.0 mm. However, the chamfered portion 43 of the present disclosure is not limited to a chamfered portion having such a dimension.

Figure 8:
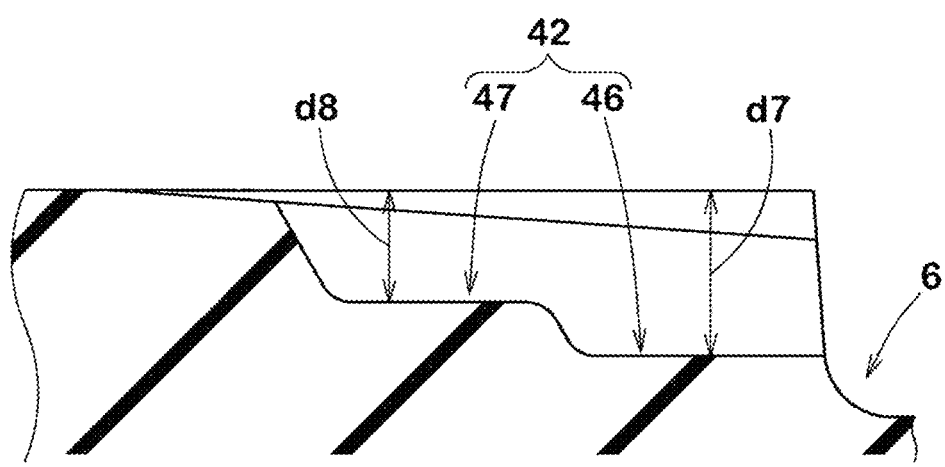
FIG. 8 is a cross-sectional view taken along a line D-D in FIG. 3.

FIG. 8 is a cross-sectional view taken along a line D-D in FIG. 3. As shown in FIG. 8, the outer shoulder sipe 42 can include a first portion 46 on the outer shoulder circumferential groove 6 side, and a second portion 47 that on the terminating end 42a side and that can have a depth less than that of the first portion 46. A depth d8 of the second portion 47 can be, for example, 60% to 75% of a depth d7 of the first portion 46. According to one or more embodiments, the depth d7 of the first portion 46 of the outer shoulder sipe 42 can be greater than the maximum depths of the inner shoulder sipe 36 and the auxiliary sipe 37 (shown in FIG. 2). Thus, ground contact sounds of the inner shoulder land portion 10 and the outer shoulder land portion 11 can become white noise, and noise performance can enhanced.

Figure 9:
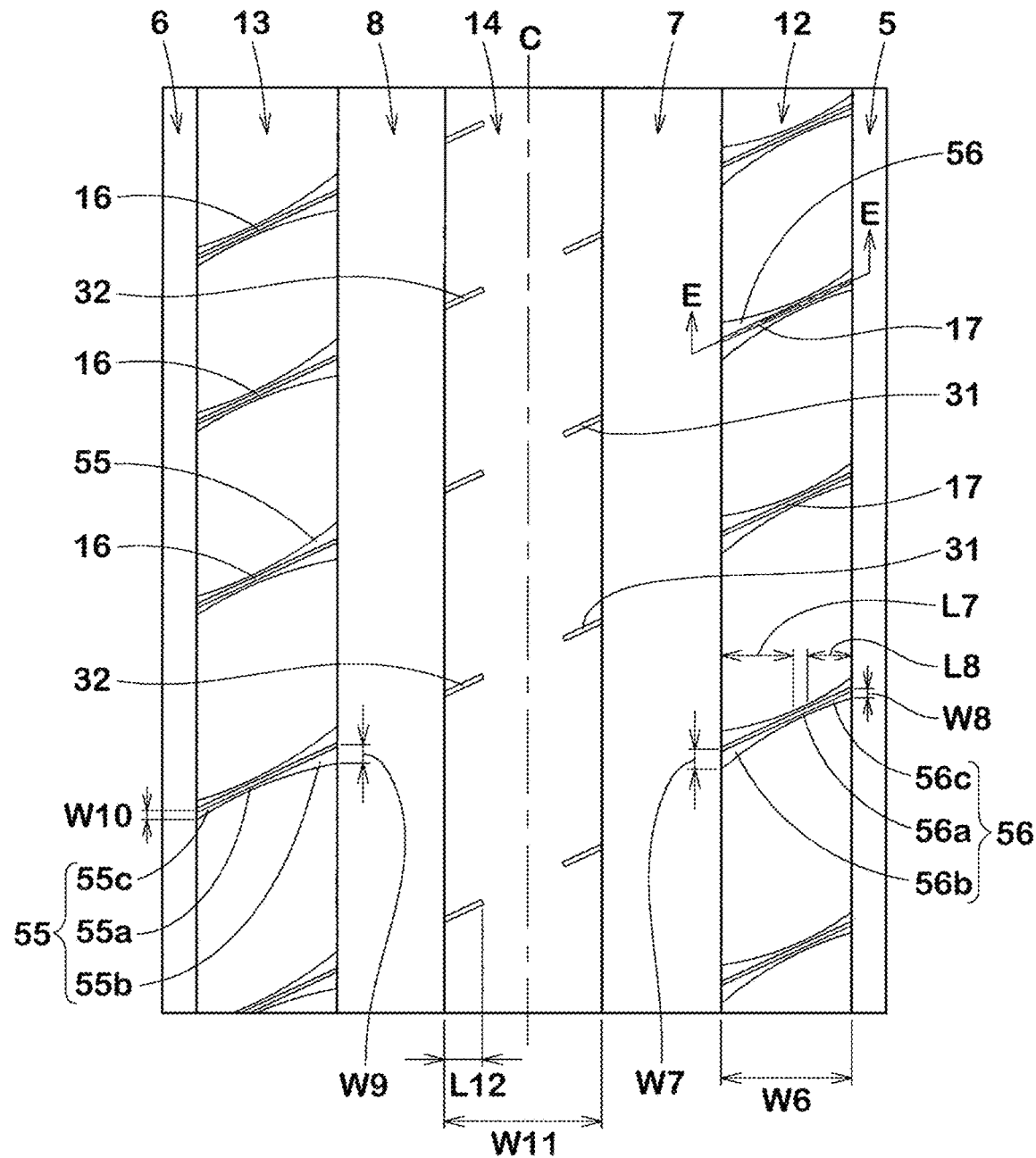
FIG. 9 is an enlarged view of an inner middle land portion, an outer middle land portion, and a crown land portion of the tread portion in FIG. 1.

FIG. 9 is an enlarged view of the inner middle land portion 12, the outer middle land portion 13, and the crown land portion 14. As shown in FIG. 9, the inner middle land portion 12 can include a plurality of inner middle sipes 17 extending completely across the inner middle land portion 12 in the tire axial direction. The inner middle sipe 17 having such a structure can allow a frictional force to be exerted during running on a wet surface and can reduce strain in a ground contact surface of the inner middle land portion 12.

The inner middle sipe 17 can be, for example, inclined in the right-upward direction relative to the tire axial direction. Hereinafter, this inclination direction may be expressed by "inclined in a second direction relative to the tire axial direction." According to one or more embodiments, an angle of the inner middle sipe 17 relative to the tire axial direction can be greater than the angle of the inner shoulder sipe 36 relative to the tire axial direction. Specifically, the angle of the inner middle sipe 17 relative to the tire axial direction can be, for instance, 20 to 30°. The inner middle sipe 17 having such a structure can allow a frictional force to be exerted also in the tire axial direction during running on a wet surface.

The inner middle sipe 17 can have a chamfered portion 56 at each of sipe edges on both sides. The chamfered portion 56 of the inner middle sipe 17 can include, for example, a constant width portion 56a, an inner increased-width portion 56b, and an outer increased-width portion 56c. The constant width portion 56a can extend with a constant chamfered width in the sipe length direction. The inner increased-width portion 56b can be, for example, continuous with the inner crown circumferential groove 7 side of the constant width portion 56a, and can have a chamfered width increased from the constant width portion 56a to the inner crown circumferential groove 7. The outer increased-width portion 56c can be, for example, continuous with the inner shoulder circumferential groove 5 side of the constant width portion 56a, and can have a chamfered width increased from the constant width portion 56a to the inner shoulder circumferential groove 5. The inner middle sipe 17 that can include the chamfered portion 56 having such a structure can facilitate uniformization of a ground contact pressure acting on the inner middle land portion 12, and can contribute to further enhancement of braking performance.

The constant width portion 56a can be, for example, disposed so as to be displaced from the center position, in the tire axial direction, of the inner middle land portion 12 toward the inner tread end Ti (shown in FIG. 1). Thus, a length L7, in the tire axial direction, of the inner increased-width portion 56b can be greater than a length L8, in the tire axial direction, of the outer increased-width portion 56c. Specifically, the length L7 of the inner increased-width portion 56b can be, for instance, 40% to 60% of a width W6 of the ground contact surface of the inner middle land portion 12. The length L8 of the outer increased-width portion 56c can be, for instance, 25% to 35% of the width W6 of the ground contact surface of the inner middle land portion 12. Thus, even when a ground contact pressure acting on the inner middle land portion 12 is changed, the above-described effect can be assuredly exhibited.

From the same viewpoint, the maximum chamfered width W7 of the inner increased-width portion 56b can be greater than the maximum chamfered width W8 of the outer increased-width portion 56c. Specifically, the chamfered width W7 of the inner increased-width portion 56b can be, for instance, 1.3 to 2.0 times the chamfered width W8 of the outer increased-width portion 56c.

Figure 10:
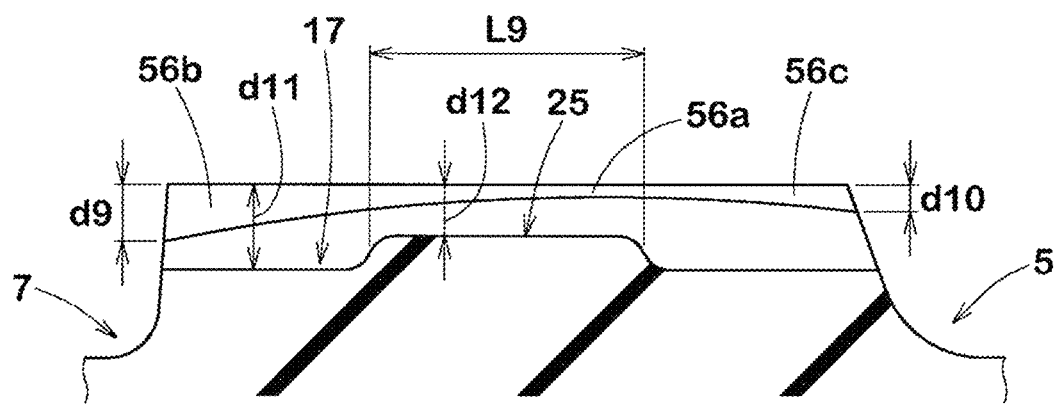
FIG. 10 is a cross-sectional view taken along a line E-E in FIG. 9.

FIG. 10 is a cross-sectional view taken along a line E-E in FIG. 9. As shown in FIG. 10, the maximum depth d9 of the inner increased-width portion 56b can be greater than the maximum depth d10 of the outer increased-width portion 56c. Specifically, the depth d9 of the inner increased-width portion 56b can be, for instance, 1.5 to 2.5 times the depth d10 of the outer increased-width portion 56c.

The inner middle sipe 17 can include, for example, a middle tie bar 25 having a locally raised groove bottom. The middle tie bar 25 can be, for example, disposed in the center of three regions in a case where the inner middle sipe 17 is equally divided into the three regions in the tire axial direction. A length L9, in the tire axial direction, of the middle tie bar 25 can be, for instance, 30% to 50% of the width W6 (shown in FIG. 9), in the tire axial direction, of the ground contact surface of the inner middle land portion 12. A depth d12 from the ground contact surface of the inner middle land portion 12 to the outer surface of the middle tie bar 25 can be, for instance, 50% to 70% of the maximum depth d11 of the inner middle sipe 17. The middle tie bar 25 having such a structure can contribute to exerting a high cornering force while maintaining stiffness of the inner middle land portion 12.

As shown in FIG. 1, a distance in the tire circumferential direction from an end 17a of the inner middle sipe 17 on the inner shoulder circumferential groove 5 side to an end 36a of the inner shoulder sipe 36 on the inner shoulder circumferential groove 5 side can be not greater than 10% of the one pitch length P2 (shown in FIG. 2) in the tire circumferential direction for the inner shoulder sipes 36, such as not greater than 5% thereof. In the present embodiment, the inner middle sipes 17 can be arranged in the above-described manner. Such an arrangement of the inner middle sipes 17 can uniformize a ground contact pressure acting on each land portion in conjunction with the inner shoulder sipes 36, and can further enhance braking performance. Such an arrangement of the sipes can linearly increase a cornering force during steering and can contribute to enhancement of steering stability.

A distance L10 in the tire circumferential direction from the inner end 35a of the inner shoulder lateral groove 35 to the end 17a of the inner middle sipe 17 can be, for instance, 30% to 50% of the one pitch length P1 (shown in FIG. 2) in the tire circumferential direction for the inner shoulder lateral groove 35. Thus, uneven wear of each land portion can be reduced.

As shown in FIG. 9, the outer middle land portion 13 can include a plurality of outer middle sipes 16 that can extend completely across the outer middle land portion 13 in the tire axial direction. The outer middle sipes 16 having such a structure can allow a frictional force to be exerted during running on a wet surface and can reduce strain in a ground contact surface of the outer middle land portion 13.

The outer middle sipe 16 can be, for example, inclined in the second direction relative to the tire axial direction. According to one or more embodiments, an angle of the outer middle sipe 16 relative to the tire axial direction can be greater than an angle of the outer shoulder sipe 42 relative to the tire axial direction. Specifically, the angle of the outer middle sipe 16 relative to the tire axial direction can be, for instance, 20 to 30°. The outer middle sipes 16 having such a structure can allow a frictional force to be exerted also in the tire axial direction during running on a wet surface.

The outer middle sipe 16 can have a chamfered portion 55 at each of sipe edges on both sides. The chamfered portion 55 of the outer middle sipe 16 can include, for example, a constant width portion 55a, an inner increased-width portion 55b, and an outer increased-width portion 55c. The constant width portion 55a can extend with a constant chamfered width in the sipe length direction. The inner increased-width portion 55b can be, for example, continuous with the outer crown circumferential groove 8 side of the constant width portion 55a, and can have a chamfered width increased from the constant width portion 55a to the outer crown circumferential groove 8. The outer increased-width portion 55c can be, for example, continuous with the outer shoulder circumferential groove 6 side of the constant width portion 55a, and can have a chamfered width increased from the constant width portion 55a to the outer shoulder circumferential groove 6. The outer middle sipe 16 that can include the chamfered portion 55 having such a structure can facilitate uniformization of a ground contact pressure acting on the outer middle land portion 13, and can contribute to further enhancement of braking performance.

The constant width portion 55*a* can be, for example, disposed so as to be displaced from the center position, in the tire axial direction, of the outer middle land portion 13 toward the outer tread end To (shown in FIG. 1). Thus, a length, in the tire axial direction, of the inner increased-width portion 55*b* can be greater than a length, in the tire axial direction, of the outer increased-width portion 55*c*. To the inner increased-width portion 55*b* and the outer increased-width portion 55*c* of the outer middle sipe 16, the above-described structures of the inner increased-width portion 56*b* and the outer increased-width portion 56*c* of the inner middle sipe 17 can be applied.

The maximum chamfered width W9 of the inner increased-width portion 55*b* of the outer middle sipe 16 can be greater than the maximum chamfered width W5 (shown in FIG. 4) of the chamfered portion 43 of the outer shoulder sipe 42. The maximum chamfered width W10 of the outer increased-width portion 55*c* of the outer middle sipe 16 can be less than the maximum chamfered width W5 of the chamfered portion 43 of the outer shoulder sipe 42. Thus, uneven wear of the outer shoulder land portion 11 and the outer middle land portion 13 can be reduced while the above-described effect is exhibited.

The outer middle sipe 16 can have the same cross-sectional shape as that of the inner middle sipe 17 shown in FIG. 10. Therefore, the structure of the above-described cross-sectional shape of the inner middle sipe 17 can be applied to the outer middle sipe 16.

As shown in FIG. 1, a distance in the tire circumferential direction from an end 16*a* of the outer middle sipe 16 on the outer shoulder circumferential groove 6 side to an end 42*b* of the outer shoulder sipe 42 on the outer shoulder circumferential groove 6 side can be not greater than 10% of the one pitch length P4 (shown in FIG. 3) in the tire circumferential direction for the outer shoulder sipes 42, such as not greater than 5% thereof. Such an arrangement of the outer middle sipes 16 can uniformize a ground contact pressure acting on each land portion in conjunction with the outer shoulder sipes 42, and can further enhance braking performance. Such an arrangement of the sipes can linearly increase a cornering force during steering and can contribute to enhancement of steering stability.

A distance L11 in the tire circumferential direction from an end 41*a* of the outer shoulder lateral groove 41 on the outer shoulder circumferential groove 6 side to the end 16*a* of the outer middle sipe 16 can be, for instance, 30% to 50% of the one pitch length P3 (shown in FIG. 3) in the tire circumferential direction for the outer shoulder lateral grooves 41. Thus, uneven wear of each land portion can be reduced.

As shown in FIG. 9, the crown land portion 14 can include a plurality of first crown sipes 31 and a plurality of second crown sipes 32. For example, the first crown sipe 31 can extend from the inner crown circumferential groove 7 and can terminate in the crown land portion 14. For example, the second crown sipe 32 can extend from the outer crown circumferential groove 8 and can terminate in the crown land portion 14. The first crown sipe 31 and the second crown sipe 32 having such structures can reduce rolling resistance while maintaining wet performance.

In order to assuredly exhibit the above-described effect, each of the first crown sipe 31 and the second crown sipe 32 may not extend across the center position, in the tire axial direction, of the crown land portion 14, and may not extend across the tire equator C. A length L12, in the tire axial direction, of the first crown sipe 31 or the second crown sipe 32 can be, for example, 15% to 30% of a width W11, in the tire axial direction, of a ground contact surface of the crown land portion 14.

The first crown sipe 31 and the second crown sipe 32 can be, for example, inclined in the second direction relative to the tire axial direction. An angle of the first crown sipe 31 or the second crown sipe 32 relative to the tire axial direction can be, for example, 20 to 30°. According to one or more embodiments, an angular difference between the outer middle sipe 16 and the first crown sipe 31 or the second crown sipe 32 may not be greater than 10°. Thus, uneven wear of the crown land portion 14 can be reduced.

In the present embodiment, each land portion may not include grooves and sipes other than the above-described grooves and sipes. Thus, the various performances described above can be exhibited in a well-balanced manner. However, the present disclosure is not limited thereto.

Figure 11:
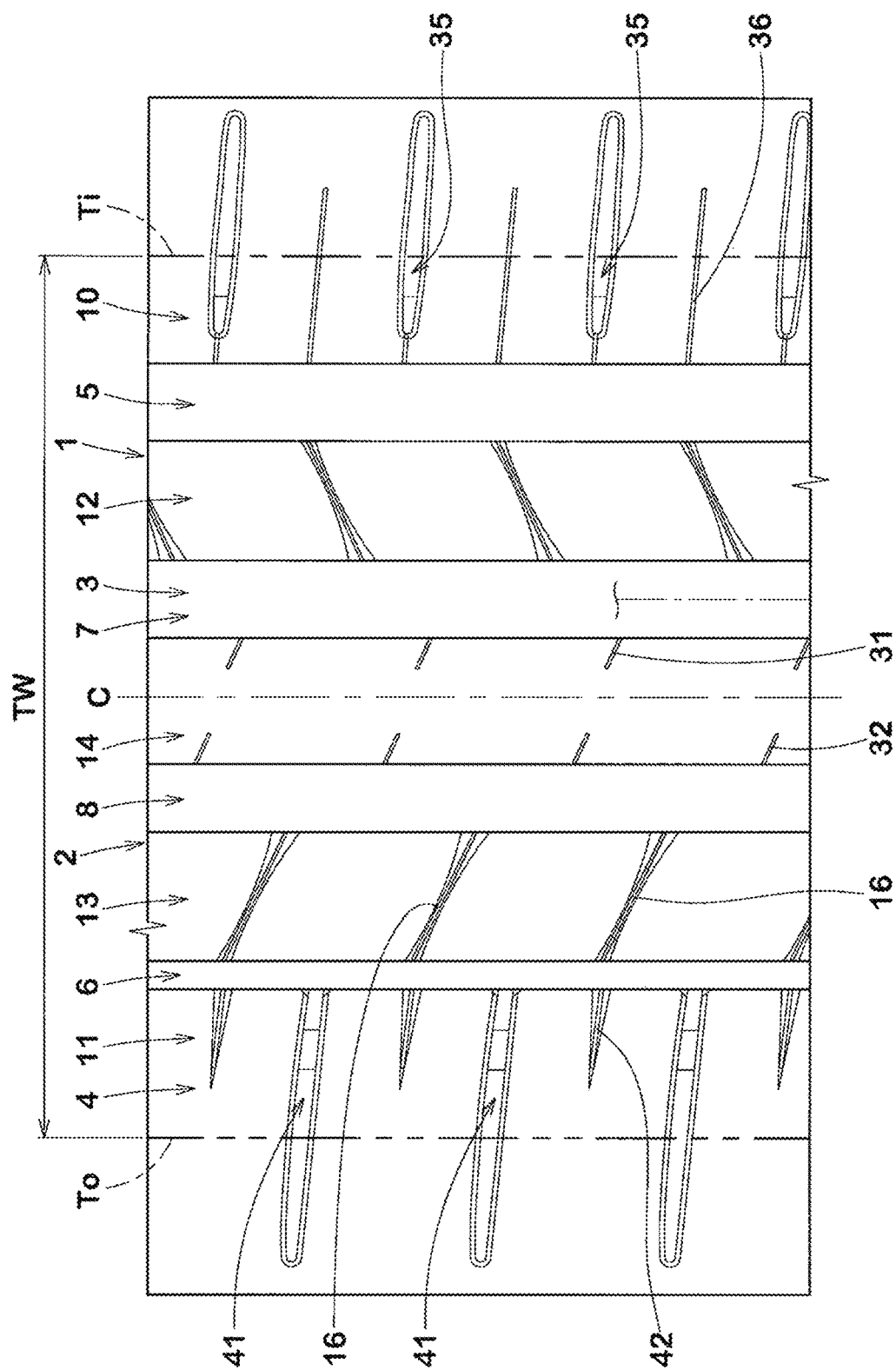
FIG. 11 is a development of a tread portion according to another embodiment of the present disclosure.

FIG. 11 is a development of a tread portion 2 according to another embodiment of the present disclosure. As shown in FIG. 11, the present embodiment is different from the embodiment shown in FIG. 1 in that, in the present embodiment, the outer middle sipes 16, and the first crown sipes 31 and the second crown sipes 32 can be inclined in the first direction relative to the tire axial direction. Such an embodiment can contribute to enhancement of conicity of the tire. The structure described for the embodiment shown in FIG. 1 to FIG. 10 can be applied to the embodiment shown in FIG. 11.

Although the tire according to the embodiments of the present disclosure has been described above in detail, the present disclosure is not limited to the above-described specific embodiments, and various modifications can be made to implement the technique of the present disclosure.

EXAMPLES

Test tires having the basic pattern shown in FIG. 1 and a size of 235/45R19 were produced based on the specifications in Tables 1 to 2. As a comparative example, a test tire having an outer shoulder land portion a shown in FIG. 12 was produced. In the tire of the comparative example, an outer shoulder sipe b in the outer shoulder land portion a included no chamfered portion. The tire of the comparative example was substantially the same as the tire shown in FIG. 1 except for the above-described structure. For each test tire, wet performance, noise performance, and braking performance were tested. Specifications common to the test tires and test methods were as follows.

Rim on which the tire was mounted: 19×8.0 J
Tire internal pressure: 230 kPa
Test vehicle: four-wheel-drive vehicle having an engine displacement of 2000 cc
Positions at which the tires were mounted: all wheels
<Wet Performance>
A driver made sensory evaluation for wet performance when the test vehicle was caused to run on a wet road surface. The result is indicated as a score with the wet performance of the comparative example being 100. The greater the value is, the more excellent wet performance is.
<Noise Performance>
Exterior noise was measured when the test vehicle was caused to run on a dry road surface at a speed of 70 km/h. The result is indicated as an index with exterior noise of the comparative example being 100. The less the value is, the less exterior noise is and the better the noise performance is.

<Braking performance>

A driver made sensory evaluation for braking performance in various states when the test vehicle was caused to run on a dry road surface. The result is indicated as a score with the braking performance of the comparative example being 100. The greater the value is, the more excellent the braking performance is.

The test results are indicated in Tables 1 to 2.

TABLE 1

Figure 12:
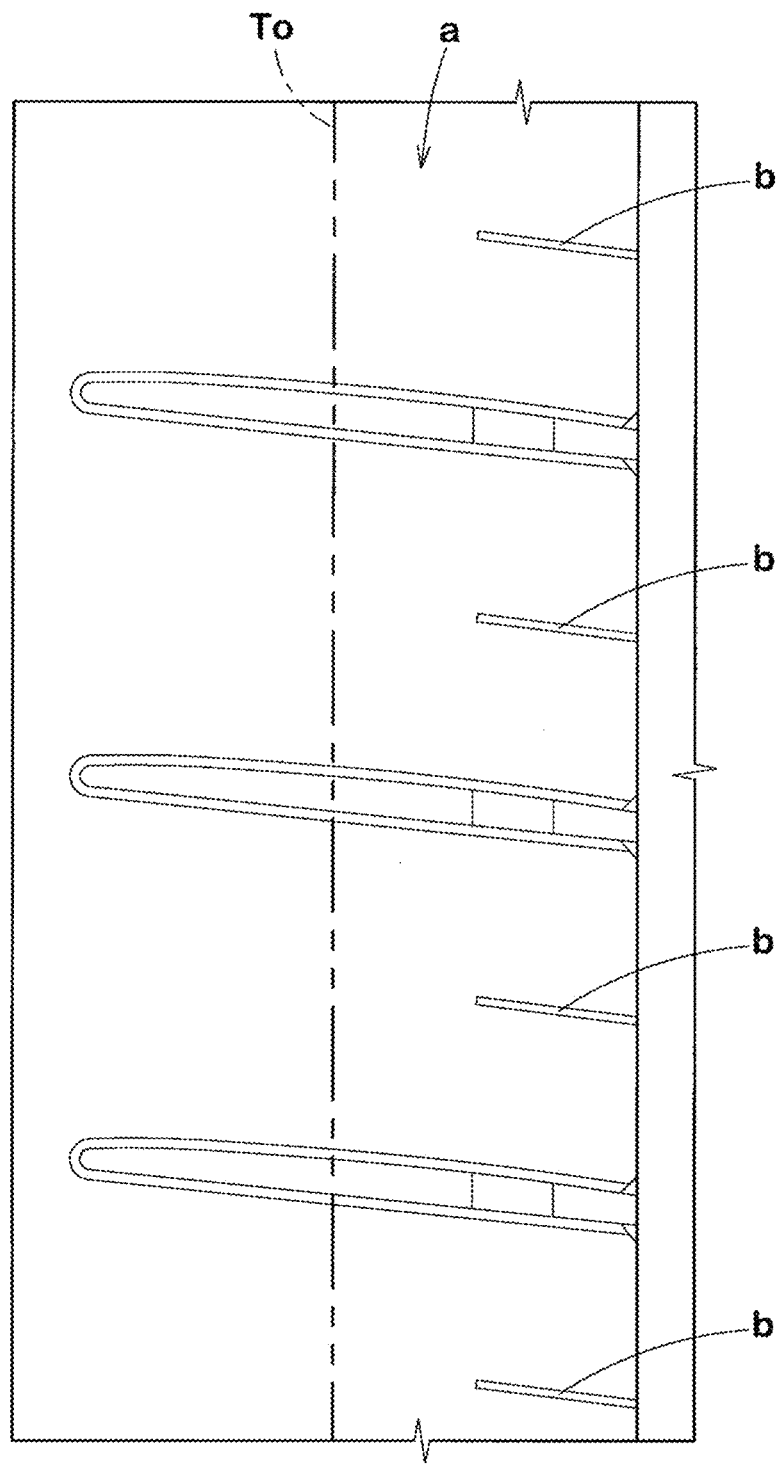
FIG. 12 is a development of an outer shoulder land portion of a tire of a comparative example.

|  | Comparative example | Example 1 | Example 2 | Example 3 | Example 4 | Example 5 | Example 6 |
|---|---|---|---|---|---|---|---|
| Figure showing outer shoulder land portion | FIG. 12 | FIG. 3 | FIG. 3 | FIG. 3 | FIG. 3 | FIG. 3 | FIG. 3 |
| Length L5 of outer shoulder sipe/width W3 of outer shoulder land portion (%) | 55 | 55 | 45 | 50 | 60 | 65 | 55 |
| Distance from end of inner middle sipe to end of inner shoulder sipe/one pitch length P2 for inner shoulder sipes (%) | 0 | 0 | 0 | 0 | 0 | 0 | 5 |
| Distance from end of outer middle sipe to end of outer shoulder sipe/one pitch length P4 for outer shoulder sipes (%) | 0 | 0 | 0 | 0 | 0 | 0 | 0 |
| Wet performance (score) | 100 | 105 | 103 | 104 | 105 | 106 | 105 |
| Noise performance (index) | 100 | 97 | 97 | 97 | 98 | 99 | 97 |
| Braking performance (score) | 100 | 105 | 104 | 105 | 105 | 104 | 105 |

TABLE 2

|  | Example 7 | Example 8 | Example 9 | Example 10 | Example 11 | Example 12 | Example 13 |
|---|---|---|---|---|---|---|---|
| Figure showing outer shoulder land portion | FIG. 3 | FIG. 3 | FIG. 3 | FIG. 3 | FIG. 3 | FIG. 3 | FIG. 3 |
| Length L5 of outer shoulder sipe/width W3 of outer shoulder land portion (%) | 55 | 55 | 55 | 55 | 55 | 55 | 55 |
| Distance from end of inner middle sipe to end of inner shoulder sipe/one pitch length P2 for inner shoulder sipes (%) | 10 | 15 | 20 | 0 | 0 | 0 | 0 |
| Distance from end of outer middle sipe to end of outer shoulder sipe/one pitch length P4 for outer shoulder sipes (%) | 0 | 0 | 0 | 5 | 10 | 15 | 20 |
| Wet performance (score) | 105 | 104 | 104 | 105 | 105 | 104 | 104 |
| Noise performance (index) | 97 | 97 | 96 | 97 | 97 | 97 | 96 |
| Braking performance (score) | 104 | 104 | 103 | 105 | 104 | 103 | 103 |

According to the test results, the tires of the examples were confirmed to enhance noise performance and braking performance while maintaining wet performance.

APPENDIXES

The present disclosure includes the following aspects. An object of the present disclosure, among multiple objects, can be to provide a tire that allows enhancement of noise performance and braking performance while maintaining wet performance.

[Disclosure 1]

A tire includes a tread portion having a designated mounting direction to a vehicle, the tread portion includes an inner tread end located on an inner side of the vehicle when the tire is mounted to the vehicle, an outer tread end located on an outer side of the vehicle when the tire is mounted to the vehicle, a plurality of circumferential grooves extending continuously in a tire circumferential direction between the inner tread end and the outer tread end, and a plurality of land portions demarcated by the circumferential grooves, the plurality of circumferential grooves includes an inner shoulder circumferential groove disposed closest to the inner tread end, and an outer shoulder circumferential groove disposed closest to the outer tread end, the plurality of land portions includes an inner shoulder land portion disposed outwardly of the inner shoulder circumferential groove in a tire axial direction, and an outer shoulder land portion disposed outwardly of the outer shoulder circumferential groove in the tire axial direction the inner shoulder land portion includes a plurality of inner shoulder lateral grooves and a plurality of inner shoulder sipes, each inner shoulder lateral groove extends from an inner end located between the inner tread end and the inner shoulder circumferential groove beyond the inner tread end, each inner shoulder sipe extends from the inner shoulder circumferential groove beyond the inner tread end, the outer shoulder land portion includes a plurality of outer shoulder lateral grooves and a plurality of outer shoulder sipes, each outer shoulder lateral groove extends from the outer shoulder circumferential groove beyond the outer tread end, each outer shoulder sipe extends from the outer shoulder circumferential groove and has a terminating end between the outer shoulder circumferential groove and the outer tread end, each outer shoulder sipe has a chamfered portion at each of sipe edges on both sides, and the chamfered portion has a chamfered width increased from the terminating end side toward the outer shoulder circumferential groove.

[Disclosure 2]

In the tire according to disclosure 1, a length, in the tire axial direction, of each outer shoulder sipe is preferably 40% to 60% of a width, in the tire axial direction, of a ground contact surface of the outer shoulder land portion.

[Disclosure 3]

In the tire according to disclosure 1 or 2, each outer shoulder lateral groove preferably includes a tie bar having a locally raised groove bottom, and a length, in the tire axial direction, of the tie bar is preferably less than a length, in the tire axial direction, of each outer shoulder sipe.

[Disclosure 4]

In the tire according to any one of disclosures 1 to 3, the plurality of land portions preferably includes an inner middle land portion disposed adjacent to the inner shoulder land portion via the inner shoulder circumferential groove. The inner middle land portion preferably includes a plurality of inner middle sipes extending completely across the inner middle land portion in the tire axial direction. A distance in the tire circumferential direction from an end of the inner middle sipe on the inner shoulder circumferential groove side to an end of the inner shoulder sipe on the inner shoulder circumferential groove side is preferably not greater than 10% of one pitch length in the tire circumferential direction for the inner shoulder sipes.

[Disclosure 5]

In the tire according to disclosure 4, a distance in the tire circumferential direction from the inner end of the inner shoulder lateral groove to the end of the inner middle sipe is preferably 30% to 50% of one pitch length in the tire circumferential direction for the inner shoulder lateral grooves.

[Disclosure 6]

In the tire according to any one of disclosures 1 to 5, the plurality of land portions preferably includes an outer middle land portion disposed adjacent to the outer shoulder land portion via the outer shoulder circumferential groove. The outer middle land portion preferably includes a plurality of outer middle sipes extending completely across the outer middle land portion in the tire axial direction. A distance in the tire circumferential direction from an end of the outer middle sipe on the outer shoulder circumferential groove side to an end of the outer shoulder sipe on the outer shoulder circumferential groove side is preferably not greater than 10% of one pitch length in the tire circumferential direction for the outer shoulder sipes.

[Disclosure 7]

In the tire according to disclosure 6, a distance in the tire circumferential direction from an end of the outer shoulder lateral groove on the outer shoulder circumferential groove side to the end of the outer middle sipe is preferably 30% to 50% of one pitch length in the tire circumferential direction for the outer shoulder lateral grooves.

[Disclosure 8]

In the tire according to any one of disclosures 1 to 7, the inner shoulder sipes are free of any chamfered portions.

[Disclosure 9]

In the tire according to any one of disclosures 1 to 8, the plurality of land portions comprises: an inner middle land portion adjacent to the inner shoulder land portion via the inner shoulder circumferential groove, and an outer middle land portion adjacent to the outer shoulder land portion via the outer shoulder circumferential groove, wherein the inner middle land portion comprises a plurality of inner middle sipes that extend completely across the inner middle land portion in the tire axial direction, wherein a first distance in the tire circumferential direction from a first end of the inner middle sipe on the inner shoulder circumferential groove side to a second end of the inner shoulder sipe on the inner shoulder circumferential groove side is not greater than 10% of one pitch length in the tire circumferential direction for the inner shoulder sipes, wherein the outer middle land portion comprises a plurality of outer middle sipes that extend completely across the outer middle land portion in the tire axial direction, and wherein a second distance in the tire circumferential direction from a third end of the outer middle sipe on the outer shoulder circumferential groove side to a fourth end of the outer shoulder sipe on the outer shoulder circumferential groove side is not greater than 10% of one pitch length in the tire circumferential direction for the outer shoulder sipes.

[Disclosure 10]

In the tire according to any one of disclosures 1 to 9, wherein the plurality of land portions comprises: an inner middle land portion adjacent to the inner shoulder land portion via the inner shoulder circumferential groove, and an outer middle land portion adjacent to the outer shoulder land portion via the outer shoulder circumferential groove, wherein the inner middle land portion comprises a plurality of inner middle sipes that extend completely across the inner middle land portion in the tire axial direction, wherein a first distance in the tire circumferential direction from a first end of the inner middle sipe on the inner shoulder circumferential groove side to a second end of the inner shoulder sipe on the inner shoulder circumferential groove side is not greater than 10% of one pitch length in the tire circumferential direction for the inner shoulder sipes, wherein a second distance in the tire circumferential direction from the inner end of the inner shoulder lateral groove to the end of the inner middle sipe is 30% to 50% of one pitch length in the tire circumferential direction for the inner shoulder lateral grooves, wherein the outer middle land portion comprises a plurality of outer middle sipes that extend completely across the outer middle land portion in the tire axial direction, wherein a third distance in the tire circumferential direction from a third end of the outer middle sipe on the outer shoulder circumferential groove side to a fourth end of the outer shoulder sipe on the outer shoulder circumferential groove side is not greater than 10% of one pitch length in the tire circumferential direction for the outer shoulder sipes, and wherein a fourth distance in the tire circumferential direction from a fifth end of the outer shoulder lateral groove on the outer shoulder circumferential groove side to the third end of the outer middle sipe is 30% to 50% of one pitch length in the tire circumferential direction for the outer shoulder lateral grooves.

[Disclosure 11]

In the tire according to any one of disclosures 1 to 10, wherein a first length, in the tire axial direction, of each said outer shoulder sipe is 40% to 60% of a width, in the tire axial direction, of a ground contact surface of the outer shoulder land portion, wherein each said outer shoulder lateral groove comprises a tie bar having a locally raised groove bottom, and wherein a second length, in the tire axial direction, of the tie bar is less than the first length, in the tire axial direction, of each said outer shoulder sipe.

[Disclosure 12]

In the tire according to any one of disclosures 1 to 11, wherein the outer shoulder lateral grooves and the outer shoulder sipes alternate in the tire circumferential direction, and/or wherein the inner should lateral grooves and the inner shoulder sipes alternate in the tire circumferential direction.

[Disclosure 13]

In the tire according to any one of disclosures 1 to 12, wherein the outer shoulder sipes and the inner shoulder sipes are inclined relative to the tire circumferential direction in opposite directions.

[Disclosure 14]

In the tire according to any one of disclosures 1 to 13, wherein the outer shoulder lateral grooves and the outer shoulder sipes are inclined relative to the tire circumferential direction in a first same direction, and/or wherein the inner should lateral grooves and the inner shoulder sipes are inclined relative to the tire circumferential direction in a second same direction.

[Disclosure 15]

In the tire according to any one of disclosures 1 to 14, wherein the outer shoulder land portion is wider than the inner shoulder land portion in the tire axial direction.

[Disclosure 16]

In the tire according to any one of disclosures 1 to 15, wherein the outer shoulder sipes are wider in the tire circumferential direction than the inner shoulder sipes.

The tire of the present disclosure has the above-described structure, and, therefore, noise performance and braking performance can be enhanced while wet performance is maintained.

What is claimed is:

1. A tire comprising:
a tread portion having a designated mounting direction to a vehicle,
wherein the tread portion comprises an inner tread end located on an inner side of the vehicle when the tire is mounted to the vehicle, an outer tread end located on an outer side of the vehicle when the tire is mounted to the vehicle, a plurality of circumferential grooves extending continuously in a tire circumferential direction between the inner tread end and the outer tread end, and a plurality of land portions demarcated by the circumferential grooves,
wherein the plurality of circumferential grooves comprises an inner shoulder circumferential groove closest to the inner tread end of the plurality of circumferential grooves, and an outer shoulder circumferential groove closest to the outer tread end of the plurality of circumferential grooves,
wherein the plurality of land portions comprises an inner shoulder land portion outward of the inner shoulder circumferential groove in a tire axial direction, and an outer shoulder land portion outward of the outer shoulder circumferential groove in the tire axial direction,
wherein the inner shoulder land portion comprises a plurality of inner shoulder lateral grooves and a plurality of inner shoulder sipes,
wherein each said inner shoulder lateral groove extends from an inner end located between the inner tread end and the inner shoulder circumferential groove beyond the inner tread end,
wherein each said inner shoulder sipe extends from the inner shoulder circumferential groove beyond the inner tread end,
wherein the outer shoulder land portion comprises a plurality of outer shoulder lateral grooves and a plurality of outer shoulder sipes,
wherein each said outer shoulder lateral groove extends from the outer shoulder circumferential groove beyond the outer tread end,
wherein each said outer shoulder sipe extends from the outer shoulder circumferential groove and has a terminating end between the outer shoulder circumferential groove and the outer tread end,
wherein each said outer shoulder sipe has a chamfered portion at each of sipe edges on both sides,
wherein the chamfered portion has a chamfered width that increases from the terminating end side toward the outer shoulder circumferential groove,
wherein each said inner shoulder lateral groove has a first end that ends in the inner shoulder land portion and an auxiliary sipe extends from the first end of the inner shoulder lateral groove and contacts the inner shoulder circumferential groove,
wherein each said outer shoulder lateral groove contacts the outer shoulder circumferential groove,
wherein each said inner shoulder sipe is without any chamfer portions,
wherein the chamfered portion of each said outer shoulder sipe starts from a first end of the outer shoulder sipe to a second end of the outer shoulder sipe to the outer shoulder circumferential groove,
wherein the inner shoulder lateral grooves and the inner shoulder sipes alternate in the tire circumferential direction, and
wherein the outer shoulder lateral grooves and the outer shoulder sipes alternate in the tire circumferential direction.

2. The tire according to claim 1,
wherein each said outer shoulder lateral groove comprises a tie bar having a locally raised groove bottom, and
wherein a first length, in the tire axial direction, of the tie bar is less than a second length, in the tire axial direction, of each said outer shoulder sipe.

3. The tire according to claim 1,
wherein the plurality of land portions comprises an inner middle land portion adjacent to the inner shoulder land portion via the inner shoulder circumferential groove, and
wherein the inner middle land portion comprises a plurality of inner middle sipes that extend completely across the inner middle land portion in the tire axial directions.

4. The tire according to claim 1, wherein the inner shoulder sipes are free of any chamfered portions.

5. The tire according to claim 1,
wherein a first length, in the tire axial direction, of each said outer shoulder sipe is 40% to 60% of a width, in the tire axial direction, of a ground contact surface of the outer shoulder land portion,
wherein each said outer shoulder lateral groove comprises a tie bar having a locally raised groove bottom, and
wherein a second length, in the tire axial direction, of the tie bar is less than the first length, in the tire axial direction, of each said outer shoulder sipe.

6. The tire according to claim 1, wherein the outer shoulder sipes and the inner shoulder sipes are inclined relative to the tire circumferential direction in opposite directions.

7. The tire according to claim 1,
wherein the outer shoulder lateral grooves and the outer shoulder sipes are inclined relative to the tire circumferential direction in a first same direction, and/or
wherein the inner should lateral grooves and the inner shoulder sipes are inclined relative to the tire circumferential direction in a second same direction.

8. The tire according to claim 1, wherein the outer shoulder land portion is wider than the inner shoulder land portion in the tire axial direction.

9. The tire according to claim 1, wherein the outer shoulder sipes are wider in the tire circumferential direction than the inner shoulder sipes.

10. The tire according to claim 1, wherein the end of the inner shoulder sipe without chamfer opposite the inner shoulder circumferential groove ends in the inner shoulder land without contacting any other features of the inner shoulder land.

11. The tire according to claim 1, wherein each of the chamfered portions tapers from thin to thick toward the outer circumferential groove.

12. The tire according to claim 1,
wherein the plurality of land portions comprises an outer middle land portion adjacent to the outer shoulder land portion via the outer shoulder circumferential groove,
wherein the outer middle land portion comprises a plurality of outer middle sipes that extend completely across the outer middle land portion in the tire axial direction, and
wherein a first distance in the tire circumferential direction from a first end of the outer middle sipe on the outer shoulder circumferential groove side to a second end of the outer shoulder sipe on the outer shoulder circumferential groove side is not greater than 10% of one pitch length in the tire circumferential direction for the outer shoulder sipes.

13. The tire according to claim 12, wherein a second distance in the tire circumferential direction from a third end of the outer shoulder lateral groove on the outer shoulder circumferential groove side to the first end of the outer middle sipe is 30% to 50% of one pitch length in the tire circumferential direction for the outer shoulder lateral grooves.

14. The tire according to claim 1, wherein a length, in the tire axial direction, of each said outer shoulder sipe is 40% to 60% of a width, in the tire axial direction, of a ground contact surface of the outer shoulder land portion.

15. The tire according to claim 14,
wherein the plurality of land portions comprises:
an inner middle land portion adjacent to the inner shoulder land portion via the inner shoulder circumferential groove, and
an outer middle land portion adjacent to the outer shoulder land portion via the outer shoulder circumferential groove,
wherein the inner middle land portion comprises a plurality of inner middle sipes that extend completely across the inner middle land portion in the tire axial direction,
wherein a first distance in the tire circumferential direction from a first end of the inner middle sipe on the inner shoulder circumferential groove side to a second end of the inner shoulder sipe on the inner shoulder circumferential groove side is not greater than 10% of one pitch length in the tire circumferential direction for the inner shoulder sipes,
wherein the outer middle land portion comprises a plurality of outer middle sipes that extend completely across the outer middle land portion in the tire axial direction, and
wherein a second distance in the tire circumferential direction from a third end of the outer middle sipe on the outer shoulder circumferential groove side to a fourth end of the outer shoulder sipe on the outer shoulder circumferential groove side is not greater than 10% of one pitch length in the tire circumferential direction for the outer shoulder sipes.

16. The tire according to claim 14,
wherein the plurality of land portions comprises:
an inner middle land portion adjacent to the inner shoulder land portion via the inner shoulder circumferential groove, and
an outer middle land portion adjacent to the outer shoulder land portion via the outer shoulder circumferential groove,
wherein the inner middle land portion comprises a plurality of inner middle sipes that extend completely across the inner middle land portion in the tire axial direction,
wherein a first distance in the tire circumferential direction from a first end of the inner middle sipe on the inner shoulder circumferential groove side to a second end of the inner shoulder sipe on the inner shoulder circumferential groove side is not greater than 10% of one pitch length in the tire circumferential direction for the inner shoulder sipes,
wherein a second distance in the tire circumferential direction from the inner end of the inner shoulder lateral groove to the end of the inner middle sipe is 30% to 50% of one pitch length in the tire circumferential direction for the inner shoulder lateral grooves,
wherein the outer middle land portion comprises a plurality of outer middle sipes that extend completely across the outer middle land portion in the tire axial direction,
wherein a third distance in the tire circumferential direction from a third end of the outer middle sipe on the outer shoulder circumferential groove side to a fourth end of the outer shoulder sipe on the outer shoulder circumferential groove side is not greater than 10% of one pitch length in the tire circumferential direction for the outer shoulder sipes, and
wherein a fourth distance in the tire circumferential direction from a fifth end of the outer shoulder lateral groove on the outer shoulder circumferential groove side to the third end of the outer middle sipe is 30% to 50% of one pitch length in the tire circumferential direction for the outer shoulder lateral grooves.

* * * * *